United States Patent
Umayahara

(10) Patent No.: US 8,557,464 B2
(45) Date of Patent: Oct. 15, 2013

(54) FUEL SUPPLY SYSTEM HAVING REGULATING DEVICE FOR SUPPLYING FUEL GAS TO AN ANODE

(75) Inventor: Kenji Umayahara, Aichi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 943 days.

(21) Appl. No.: 12/303,915

(22) PCT Filed: May 29, 2007

(86) PCT No.: PCT/JP2007/061394
§ 371 (c)(1),
(2), (4) Date: Dec. 8, 2008

(87) PCT Pub. No.: WO2007/142245
PCT Pub. Date: Dec. 13, 2007

(65) Prior Publication Data
US 2010/0159341 A1 Jun. 24, 2010

(30) Foreign Application Priority Data
Jun. 9, 2006 (JP) .................................. 2006-161488

(51) Int. Cl.
*H01M 8/04* (2006.01)
(52) U.S. Cl.
USPC ........................................ 429/444; 429/429
(58) Field of Classification Search
USPC .......... 429/444, 446, 513, 515, 414, 410, 429
See application file for complete search history.

(56) References Cited

U.S. PATENT DOCUMENTS

| | | | |
|---|---|---|---|
| 2002/0094467 A1* | 7/2002 | Nonobe et al. ............... | 429/34 |
| 2003/0232227 A1* | 12/2003 | VanZee et al. ............... | 429/25 |
| 2004/0067399 A1 | 4/2004 | Kobayashi et al. | |
| 2004/0229098 A1* | 11/2004 | Fujita ........................... | 429/25 |
| 2006/0024548 A1* | 2/2006 | Pechtold et al. .............. | 429/34 |
| 2007/0243426 A1* | 10/2007 | Bono ............................ | 429/13 |

FOREIGN PATENT DOCUMENTS

| | | |
|---|---|---|
| DE | 10 2004 049 165 A1 | 3/2006 |
| DE | 11 2005 001 162 T5 | 4/2007 |
| JP | 6-150952 A | 5/1994 |
| JP | 2002-321901 A | 11/2002 |
| JP | 2003-331889 A | 11/2003 |
| JP | 2004-139984 A | 5/2004 |

(Continued)

OTHER PUBLICATIONS

Machine Translation of: JP 2004/165058 A, Okamoto, M. Jun. 10, 2004.*

*Primary Examiner* — Kenneth Douyette
(74) *Attorney, Agent, or Firm* — Kenyon & Kenyon LLP

(57) ABSTRACT

In the present invention, after the initial setting of the FC entry target pressure, the FC entry target pressure is maintained at this initial-setting value until the concentration of impurities in the gas supplied to the anode in the fuel cell falls below a certain value. This initial-setting value is set to a pressure higher than the FC entry target pressure set in response to the FC electric current during normal power generation. If the concentration of impurities in the gas supplied to the anode in the fuel cell has fallen below the certain value, then the FC entry target pressure is sought using a map showing the relationship between the FC electric current detected in step S5 and the entry target pressure set in response to the output required for the fuel cell.

4 Claims, 4 Drawing Sheets

(56) References Cited

FOREIGN PATENT DOCUMENTS

| JP | 2004-165058 A | 6/2004 |
| JP | 2004-193107 A | 7/2004 |
| JP | 2005-231980 A | 9/2005 |
| JP | 2006-79891 A | 3/2006 |
| JP | 2007-165018 A | 6/2007 |
| WO | WO-2005/112167 A | * 11/2005 |
| WO | WO-2005/112170 | * 11/2005 |

* cited by examiner

FUEL SUPPLY SYSTEM HAVING REGULATING DEVICE FOR SUPPLYING FUEL GAS TO AN ANODE

This is a 371 national phase application of PCT/JP2007/061394 filed 29 May 2007, which claims priority to Japanese Patent Application No. 2006-161488 filed 09 Jun. 2006, the contents of which are incorporated herein by reference.

FIELD OF THE INVENTION

This invention relates to a fuel cell system that performs power-generation-recovery processing upon activation of the system.

BACKGROUND OF THE INVENTION

As a fuel cell system that has as its energy source a fuel cell that generates power from the electrochemical reaction between fuel gas and oxidizing gas, for example, JP Patent Publication No. 2004-165058 discloses a technique of performing so-called power-generation-recovery processing that, while the system is warming-up after activation, if the fuel cell's output voltage is judged to be low, and this drop in output voltage is judged to be caused by residual nitrogen in the fuel cell, increases the amount of fuel gas supplied to the fuel cell.

DISCLOSURE OF THE INVENTION

In fuel cell systems that perform power-generation-recovery processing upon activation of the system, after activation of the system, just after switching to normal operation (normal power generation), compared to the target gas supply pressure for the anode (hereinafter "target pressure") the actual pressure (hereinafter "actual pressure") is high, so even though there is a high concentration of impurities (for example, nitrogen) in the anode, pressure reduction processing takes place in order to have the actual pressure match the target pressure.

During this pressure reduction processing, because new fuel gas stops being supplied to the fuel cell, which is located further downstream of the regulator that regulates the anode's gas supply pressure, this provokes a reduction in fuel gas concentration, and by extension the voltage generated by the fuel cell (cell voltage), and there are cases where this can impede smooth transition to normal operation, or regular maintenance of the same. The present invention takes these circumstances into account, and has the object of suppressing any reduction in the voltage generated by the fuel cell that may take occur after performing power-generation-recovery processing upon system activation.

In order to achieve the above object, the present invention is a fuel cell system in which a fuel cell, a fuel supply system for supplying fuel gas to an anode in the fuel cell, and a regulating means that is provided in said fuel supply system and adjusts the amount of gas supplied to said anode are provided, and in which, at system activation, the regulating means maintains the amount of new fuel gas supplied from a fuel supply source to the anode at a level higher than the new fuel gas supply-amount set in response to the electric current generated by said fuel cell during normal power generation until the concentration of impurities in the gas supplied to the anode falls below a certain value.

With this configuration, when the system is activated, power-generation-recovery processing that supplies fuel gas to the anode at a pressure higher than during normal power generation takes place, and subsequently, just after switching to normal operation (normal power generation), even if pressure reduction processing in order to have the actual pressure at the anode entrance match the target pressure is performed, the concentration of impurities in the fuel gas supply system, including the anode interior, is lowered below a certain value—in other words, the fuel gas concentration is raised above a certain value, so even in a state where the amount of fuel gas supplied to the anode is to be reduced even further as a consequence of the pressure reduction processing, any reduction in the voltage generated by the fuel cell (cell voltage) will be suppressed. Along with having the variable gas supply device that adjusts the fuel supply system's upstream gas state to the target value and supplies gas downstream, and a control device that performs drive control for the variable gas supply device depending on the target value, in the regulating means, the amount of gas supplied to the anode by the variable gas supply device may be increased above the amount supplied during normal power generation The variable gas supply device may supply fuel gas to the anode at a pressure higher than during normal power generation, and keep the gas supply pressure to the anode higher than during normal power generation until the nitrogen concentration is reduced below a certain value.

The regulating means has a circulation passage for mixing the fuel off-gas exhausted from the fuel cell anode's exhaust port with new fuel gas and re-supplying it to the anode's entry port, and a shut-off valve, set in the circulation passage, that when open emits fuel off-gas to the outside of the system, and may reduce the amount of gas supplied to the anode even further in response to the shut-off valve being open. When the shut-off valve is open and some of the fuel off-gas is emitted to the outside of the system, the concentration of impurities in the gas mix of the new fuel gas from the fuel supply source and fuel off-gas supplied to the anode becomes lower—in other words, the concentration of the fuel gas in the gas mix increases, so even if the amount of fuel gas supplied to the anode is reduced even further, any reduction in the voltage generated by the fuel cell will be suppressed, and fuel economy can be improved. The variable gas supply device has a valve seat with an injection opening that injects gaseous fuel (fuel gas), a nozzle body that guides the supply of the gaseous fuel to the injection opening, and a valve movably retained with respect to the axial direction of the nozzle body, and the injection opening may be opened/closed by having the valve driven, by an electromagnetic drive force, at a certain drive-cycle. With the present invention, any reduction in the voltage generated by the fuel cell that may occur when performing power-generation-recovery processing upon system activation can be suppressed.

BEST MODE FOR IMPLEMENTATION OF THE INVENTION

Figure 1:
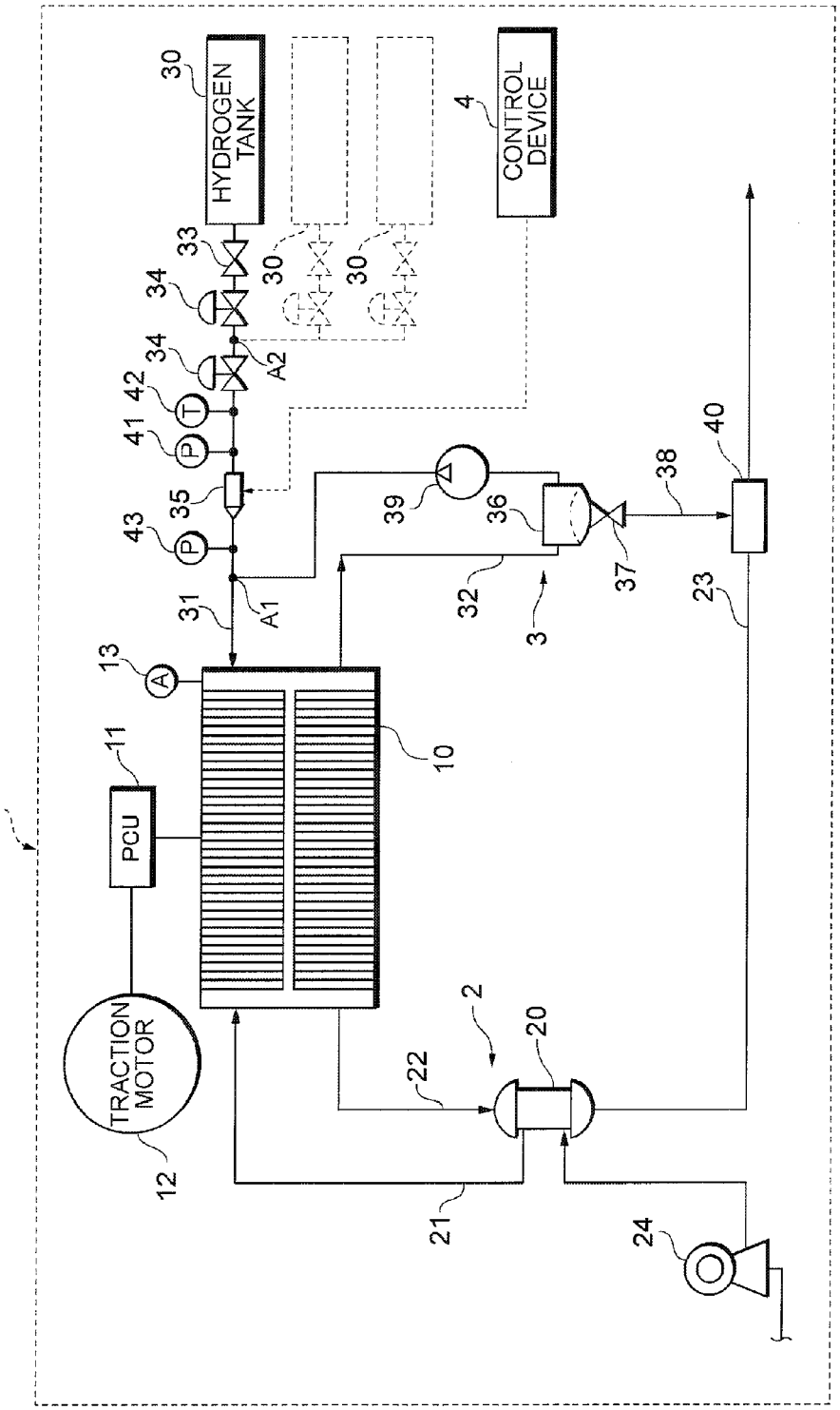
FIG. 1 is a configuration diagram of a fuel cell system according to an embodiment of the present invention.

A fuel cell system 1 according to an embodiment of the present invention will be explained below with reference to the diagrams. In the present embodiment, the present invention will be explained assuming an example utilized in an on-board electric power generation system in a vehicle (moving body). First, the configuration of the fuel cell system 1 according to an embodiment of the present invention will be explained using FIG. 1. As shown in FIG. 1, the fuel cell system 1 according to the present embodiment has a fuel cell 10 that receives a supply of reactant gas (oxidizing gas and fuel gas) and generates power, along with an oxidizing gas piping system (fuel supply system) 2 that supplies air as oxidizing gas to the fuel cell 10, a hydrogen gas piping system 3 that supplies hydrogen gas as fuel gas to the fuel cell 10, and a control device 4 or the like that performs overall control of the entire system.

In the fuel cell 10, the electric power generated by the fuel cell 10, which has a stack structure configured from the necessary number of power-generating electric cells supplied with the reactant gas, is supplied to a PCU (Power Control Unit) 11. The PCU 11 has an inverter or DC-DC converter or similar arranged between the fuel cell 10 and a traction motor 12. The fuel cell 10 also has installed an electric current sensor 13, which detects electric current during electric power generation.

The oxidizing gas piping system 2 has an air supply passage 21, which supplies oxidizing gas (air) humidified by the humidifier 20 to the fuel cell 10, and an air exhaust passage 22 that guides the oxidized off-gas exhausted from the fuel cell 10 to the humidifier 20, and a ventilation passage 23 for guiding the oxidized off-gas from the humidifier 20 to the outside. The air supply passage 21 is provided with a compressor 24 that captures oxidizing gas in the atmosphere and force-feeds it to the humidifier 20.

The hydrogen gas piping system 3 has a hydrogen tank (fuel supply source) 30 as a fuel supply source storing high-pressure (e.g. 70 MPa) hydrogen gas, a hydrogen supply passage 31 as a fuel supply passage for supplying the hydrogen tank 30's hydrogen gas to the fuel cell 10, and a circulation passage 32 for returning the hydrogen off-gas exhausted from the fuel cell 10 to the hydrogen supply passage 31. The hydrogen gas piping system 3 is one embodiment of the fuel supply system according to the present invention.

Moreover, instead of the hydrogen tank 30, a reformer that generates hydrogen-rich reformed gas from a hydrocarbon-type fuel and a high-pressure gas tank that accumulates the reformed gas in a high-pressure state can be utilized as the fuel supply source. Furthermore, a tank that has a hydrogen absorbing alloy may also be utilized as the fuel supply source.

A cut-off valve 33 that cuts-off or allows the supply of hydrogen gas from the hydrogen tank, a regulator 34 that adjusts the pressure of the hydrogen gas, and an injector (variable gas supply device) 35 are provided in the hydrogen supply passage 31. A primary pressure sensor 41 and a temperature sensor 42 that detect the pressure and temperature of the hydrogen gas in the hydrogen supply passage 31 are provided upstream of the injector 35. Furthermore, downstream of the injector 35, a secondary pressure sensor 43 that detects the pressure of the hydrogen gas in the hydrogen supply passage 31 is provided upstream of the junction of the hydrogen supply passage 31 and the circulation passage 32. The regulator 34 is a device that adjusts the pressure (primary pressure) to the previously-set secondary pressure. In the present embodiment, a mechanical pressure-reduction valve that reduces the primary pressure is utilized as the regulator 34. A well-known configuration formed having a back-pressure chamber and a pressure-adjustment chamber separated by a diaphragm and using the back-pressure in the back-pressure chamber to reduce the primary pressure to a certain pressure inside the pressure-adjustment chamber and setting it as the secondary pressure can be utilized as the configuration of the mechanical pressure-reduction valve.

In the present embodiment, as shown in FIG. 1, by arranging two regulators 34 upstream of the injector 35, the pressure upstream of the injector 35 can be reduced effectively. As a result, the degree of design freedom with respect to the mechanical structure of the injector 35 (valves, housing, passages, driver devices, etc.) can be increased.

Furthermore, as the pressure upstream of the injector 35 can be reduced, difficulty in movement of the valve in the injector 35, which is caused by an increase in pressure difference between the pressure upstream and downstream of the injector 35, can be suppressed. Accordingly, the extent to which the pressure downstream of the injector 35 can be adjusted can be increased, while any reduction in responsiveness of the injector 35 can be suppressed.

The injector 35 is an electromagnetic drive-type shut-off valve that can adjust the gas-state of the gas flow or pressure, etc., by directly driving the valve with electromagnetic drive force at a certain drive cycle and putting distance between it and the valve seat. Along with a valve seat that has an injection opening that injects gaseous fuel such as hydrogen gas or the like, the injector 35 is provided with a nozzle body that guides the supply of the gaseous fuel to the injection opening, and a valve, movably retained with respect to the axial direction (gas flow direction) of the nozzle body, that opens/closes the injection opening.

In the present embodiment, the injector 35's valve is driven by a solenoid electromagnetic drive device, and as a result of the on/off state of the pulsed excitation current fed to this solenoid, the opening area of the injection opening can be switched to 2-step, multi-step, continuous (non-step), or linear [mode]. Furthermore, by controlling the gas injection time and gas injection timing, the throughput and pressure of the hydrogen gas can be controlled with great precision.

As explained above, the injector 35 uses electromagnetic drive force to directly drive the opening and closing of the valve (valve and valve seat), and is highly responsive, because the drive cycle can be controlled to set in a high response region. Along with the gas flow being adjusted depending on the opening or closing of the valve in the injector 35, the gas pressure supplied downstream of the injector 35 is reduced under the gas pressure upstream of the injector 35, so the injector 35 can also be understood as a regulator (pressure-reduction valve, regulator). Furthermore, in the present embodiment, it can also be understood as a variable regulator able to alter the pressure-adjusted amount (pressure-reduced amount) of the gas pressure upstream of the injector 35 to have, depending on the gas requirement, the required pressure matched within a certain pressure scope.

Furthermore, in the present embodiment, as shown in FIG. 1, the injector 35 is arranged upstream of the junction A1 of the hydrogen supply passage 31 and the circulation passage 32. Furthermore, as shown with a broken line in FIG. 1, when plural hydrogen tanks 30 are utilized as the fuel supply source, an injector 35 is arranged to be downstream of the section (hydrogen gas junction A 2) where the hydrogen gas supplied from each hydrogen tank 30 is combined.

An exhaust passage 38 is connected to the circulation passage 32 via gas-liquid separator 36 and gas/liquid exhaust valve 37. The gas-liquid separator 36 recovers moisture from the hydrogen off-gas. Operating in accordance with instructions from the control device 4, the gas/liquid exhaust valve 37 exhausts (purges) to the outside hydrogen off-gas, including impurities (for example, nitrogen) in the circulation passage 32 and moisture recovered at the gas-liquid separator 36.

Furthermore, the circulation passage is provided with a hydrogen pump 39 that increases the pressure of hydrogen off-gas in the circulation passage 32 and sends it to the hydrogen supply passage 31. The gas in the exhaust passage 38 is diluted by the diluter 40 and combined with the gas in the ventilation passage 23.

The control device 4 detects how much an acceleration-operation device (accelerator or similar) the vehicle has is operated, receives control information such as the acceleration requirement value (for example, the power generation amount requested by the load-device of the traction motor 12 or similar), and controls the behavior of various pieces of equipment in the system.

Figure 2:
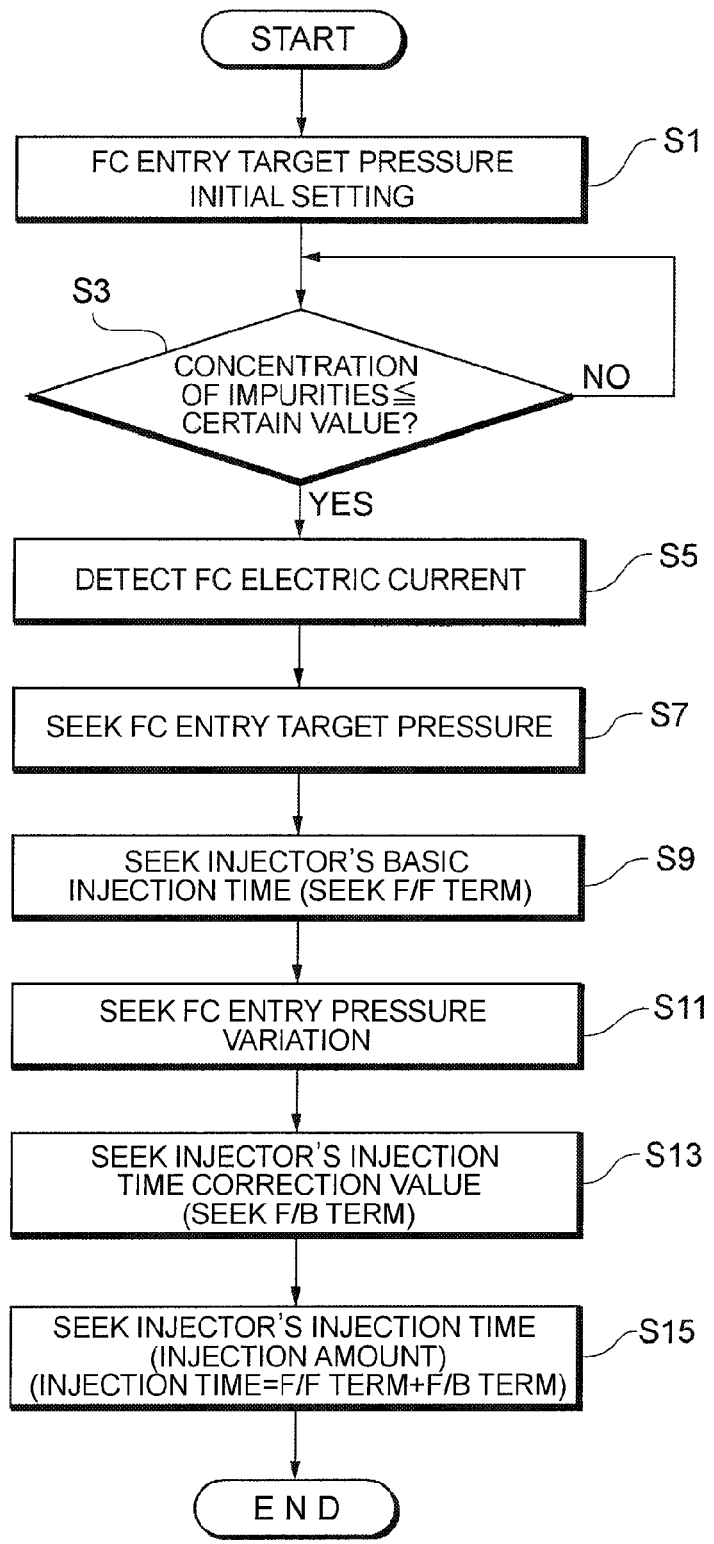
FIG. 2 is a flowchart to explain the control flow of the injector shown in FIG. 1.

The control device 4 is configured from a computer system not shown in the diagrams. This computer system has a CPU, ROM, RAM, HDD, an input/output interface and display, etc., and realizes various kinds of control by the CPU reading and executing various types of control programs recorded in the ROM. FIG. 2 is the control flow for when the system is activated; more specifically, the control flow implemented for the injector 35 from activation of the system to the switch to normal power generation (normal operation), such as when, for example, the control device 4 detects a user-initiated ignition-on signal, and starts supply of the reactant gas to the fuel cell 10.

Figure 3:
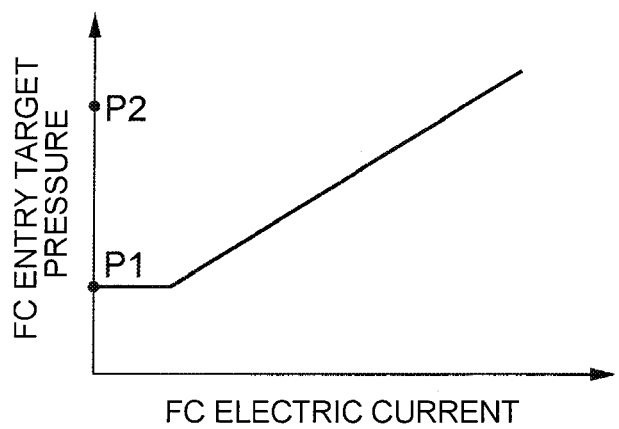
FIG. 3 is one example of the map used in the processing in step S7 of the flowchart shown in FIG. 2.
Figure 4:
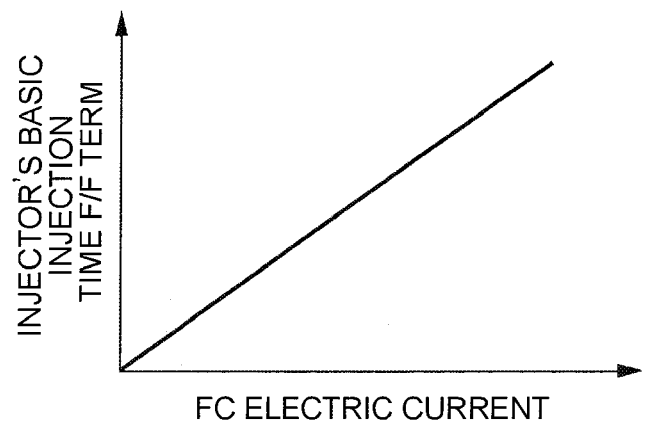
FIG. 4 is one example of the map used in the processing in step S9 of the flowchart shown in FIG. 2.

Furthermore, FIG. 3 is a map showing the relationship between the fuel cell 10's generated electric current (hereinafter, "FC electric current") and the fuel cell 10's entry-side target pressure (hereinafter, "FC entry target pressure"), used in the processing in step S7 in FIG. 2, while FIG. 4 is a map showing the relationship between the FC electric current and the injector 35's basic injection time (F/F term), used in the processing in step S9 in FIG. 2

In the flowchart in FIG. 2, first the initial setting for the FC entry target pressure is established (step S1). Then the FC entry target pressure is maintained at this initial-setting value until the concentration of impurities in the gas supplied to the anode in the fuel cell 10 falls below a certain value (step S3:NO). This initial-setting value is set to a certain pressure P2 that is higher than the FC entry target pressure (fuel gas supply amount) set in response to the FC electric current during normal power generation, in other words, the pressure P1 in FIG. 3.

Figure 5:
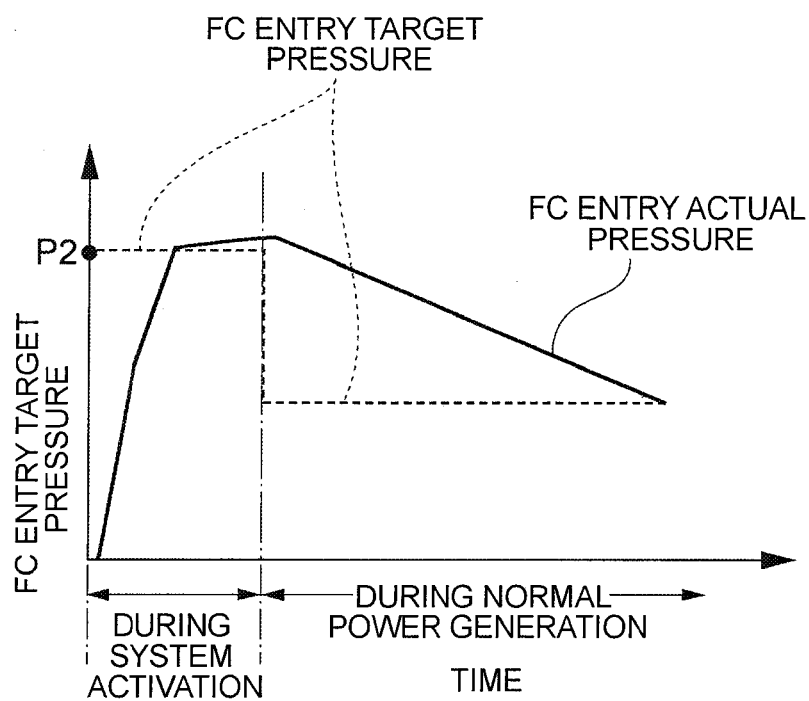
FIG. 5 is a diagram for explaining the relationship between the fuel cell entry-side target pressure and actual pressure when the injector shown in FIG. 1 is controlled according to the flowchart shown in FIG. 2.

As a result of this, at system activation in the present embodiment, as shown in FIG. 5, the FC entry target pressure shown in the same diagram (the amount of new hydrogen gas supplied to the anode in the fuel cell 10 from the hydrogen tank 30) is maintained at a level higher than the FC entry target pressure set in response to the FC electric current during normal power generation, until the concentration of impurities in the gas supplied to the anode in the fuel cell 10 falls below the certain value indicated with a dash-dotted line in the same diagram.

Accordingly, as shown with a continuous line in the same diagram, the actual pressure at the entry-side of the anode of the fuel cell 10 is maintained at a level higher than during normal power generation until the concentration of impurities in the gas supplied to the anode in the fuel cell 10 falls below the certain value indicated with a dash-dotted line in the same diagram, and the amount of gas supplied to the anode of the fuel cell 10 by the injector 35 is increased more than during normal power generation.

Furthermore, the judgment in step S3, for example, takes place based on the result of detection by the nitrogen sensor or similar, but it is not limited to this, and the hydrogen concentration of the gas supplied to the anode of the fuel cell 10 may be directly detected by a hydrogen sensor, and the concentration of impurities having fallen below the certain value judged based on the result of that detection.

If the concentration of impurities in the gas supplied to the anode in the fuel cell 10 has fallen below the certain value (step S3:YES), the FC electric current is detected by the electric current sensor 13 (step S5), then using, for example, the map shown in FIG. 3—in other words, the map showing the relationship between the FC electric current detected in step S5 and the entry target pressure set in response to the output required for the fuel cell 10—the FC entry target pressure is sought from FC electric current detected in step S5 (step S7).

Furthermore, by having plural FC entry target pressure maps in response to the concentration of impurities in the anode in the fuel cell 10 as the map(s) with the relationship between the FC electric current and the entry target pressure shown in FIG. 3, in step S7, the FC entry target pressure may be decided in response to the FC electric current and the concentration of impurities in the anode.

Next, using, for example, the map shown in FIG. 4—in other words, the map showing the relationship between the FC electric current and the feed-forward term (hereinafter, "F/F term"), which is the injector 35's basic injection time—the control device 4 seeks the F/F term, which is the injector 35's basic injection time, from the FC electric current detected in step S5 (step S9). Then, the control device 4 seeks the variation between the FC entry target pressure sought in step S7 and the current fuel cell 10 pressure detected by the secondary-side pressure sensor 43 (step S11), and seeks, as a correction value to correct (reduce) the FC entry pressure variation, the feed-back term (hereinafter, "F/B term") of the injector's injection time (step S13).

Next, by adding the F/B term sought in step S13 to the F/F term, which is the injector 35's basic injection time, sought in step S9 along with, when necessary, a further correction value, the control device 4 seeks the injector 35's injection time (injection amount)(step S15).

Then the control device 4 controls the injection time and injection timing by sending a control signal for realizing the relevant injection time to the injector 35, and adjusts the flow and pressure of the hydrogen gas supplied to the fuel cell 10. Thereafter, the processing in steps S5-S15 is repeated in a set cycle.

As explained above, in the fuel cell system 1 in the present embodiment, upon system activation, power-generation-recovery processing that supplies hydrogen gas to the anode of the fuel cell 10 at a pressure higher than during normal operation (normal power generation) takes place, and subsequently, just after switching to normal operation, even if pressure reduction processing in order to have the anode entry-side FC entry actual pressure match the FC entry target pressure is performed, the concentration of impurities in the hydrogen gas piping system 3, including the anode interior, is being lowered below a certain value—in other words, the hydrogen gas concentration is being raised above a certain value, so even in a state where the amount of hydrogen gas supplied to the anode is to be reduced even further in accordance with the pressure reduction processing, any reduction in the voltage generated by the fuel cell (cell voltage) during normal operation can be suppressed.

The above embodiment is an example to explain the present invention, and the present invention is limited to that embodiment; various components can be suitably designed so long as they do not depart from the gist of the present invention. For example, when the gas/liquid exhaust valve 37 is opened, in response to that, the control device 4 may control the opening/closing operation of the injector 35 to have the amount of gas supplied to the anode of the fuel cell 10 reduced even further than it was.

In other words, when the gas/liquid exhaust valve 37 opens and some of the hydrogen off-gas is emitted to the outside of the system, the concentration of impurities in the gas mix of the new fuel gas from the hydrogen tank 30 and hydrogen off-gas supplied to the anode of the fuel cell 10 becomes lower—in other words, the concentration of the hydrogen gas in the gas mix increases, so even if the amount of gas supplied to the anode of the fuel cell 10 is reduced even further than the amount of gas supplied until then, any reduction in the generated voltage will be suppressed.

Accordingly, if the above embodiment is configured to, in response to the gas/liquid exhaust valve 37 opening, reduce even further the amount of gas supplied to the anode of the fuel cell 10, any reduction in the generated voltage of the fuel cell 10 during normal operation can be suppressed, and fuel economy can be improved. Furthermore, while the above embodiment gave an example where a fuel cell vehicle was equipped with the fuel cell system according to the present invention, various other movable objects other than fuel cell vehicles (robots, ships, planes) can also be equipped with the fuel cell system according to the present invention. Furthermore, the fuel cell system according to the present invention can also be utilized in a fixed power generation system used as power generation equipment in buildings (houses, office buildings, etc.).

The invention claimed is:

1. A fuel cell system, comprising:
    a fuel cell;
    a fuel supply system for supplying fuel gas to an anode in said fuel cell;
    a circulation passage that mixes fuel off-gas exhausted from an anode exhaust port of said fuel cell with a new fuel gas from a fuel supply source and re-supplies it to an entry port of the anode;
    a shut-off valve provided in said circulation passage that, when open, emits said fuel off-gas to the outside of the system; and
    a regulating system which is programmed to adjust the amount of the new fuel gas to be supplied to said anode and to control the opening state of the shut-off valve,
    wherein said regulating system is programmed to control both a first operating mode, for providing higher levels of new fuel gas during fuel cell activation, and a second operating mode, for purging high levels of impurities from the circulation passage following a normal power generation mode,
    wherein during said first operating mode said shut-off valve is controlled to be in a closed state and the amount of new fuel gas supplied from said fuel supply is controlled to maintain an amount of the new fuel cell gas from said fuel supply source to said anode at a level higher than a new fuel gas supply amount set in response to an electric current generated by said fuel cell during normal power generation,
    wherein said first operating mode is maintained until a concentration of impurities in said fuel gas supplied to said anode falls below a previously set reference value, and
    wherein during said second operating mode said regulating system is programmed to reduce a new fuel gas supply amount from the amount provided during the normal power generation mode prior to opening the shut-off valve so as to reduce the amount of impurities in the circulation passage.

2. The fuel cell system set forth in claim 1, in which said regulating system is provided with:
    a variable gas supply device that adjusts an upstream gas state of said fuel supply system to a target value and supplies gas downstream; and
    a control device that performs drive control of said variable gas supply device in response to said target value, and, at the fuel cell system activation, increases a gas supply amount from said variable gas supply device to said anode to more than that during normal power generation.

3. The fuel cell system set forth in claim 2, in which said variable gas supply device supplies, at the fuel cell system activation, fuel gas at a pressure higher than during normal power generation to said anode, and maintains a gas supply pressure to said anode at a level higher than during normal power generation until a determined concentration of nitrogen in the gas supplied to said anode falls below a certain value.

4. The fuel cell system set forth in claim 1, in which said variable gas supply device is provided with:
    a valve seat with an injection opening that injects gaseous fuel;
    a nozzle body that guides supply of that gaseous fuel to said injection opening; and
    a valve movably retained with respect to the axial direction of said nozzle body,
    in which said injection opening is opened/closed by said valve being driven, by an electromagnetic drive force, at a certain drive-cycle.

* * * * *

UNITED STATES PATENT AND TRADEMARK OFFICE
CERTIFICATE OF CORRECTION

PATENT NO. : 8,557,464 B2  Page 1 of 1
APPLICATION NO. : 12/303915
DATED : October 15, 2013
INVENTOR(S) : Kenji Umayahara It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 740 days.

Signed and Sealed this

Fifteenth Day of September, 2015

Michelle K. Lee
*Director of the United States Patent and Trademark Office*